United States Patent [19]
Alegria

[11] 3,807,786
[45] Apr. 30, 1974

[54] PALLET PULLER

[76] Inventor: John J. Alegria, 426 Castello Rd., Lafayette, Calif. 94549

[22] Filed: Oct. 10, 1972

[21] Appl. No.: 295,926

[52] U.S. Cl. .............................. 294/104, 294/116
[51] Int. Cl. ............................................. B66c 1/48
[58] Field of Search............ 294/85, 86 R, 101, 103, 294/104, 106, 116; 24/248 E, 248 R, 248 A, 249 FP

[56] References Cited
UNITED STATES PATENTS

| | | | |
|---|---|---|---|
| 2,507,058 | 5/1550 | Stone | 294/104 X |
| 2,362,707 | 11/1944 | Malmquist | 24/248 A |
| 1,938,485 | 12/1933 | Cossor | 294/106 |

*Primary Examiner*—Evon C. Blunk
*Assistant Examiner*—Johnny D. Cherry

[57] ABSTRACT

A device to draw pallets from inaccessible locations which clamps onto the pallet stringer as drawing force is applied to it.

1 Claim, 6 Drawing Figures

PATENTED APR 30 1974 3,807,786
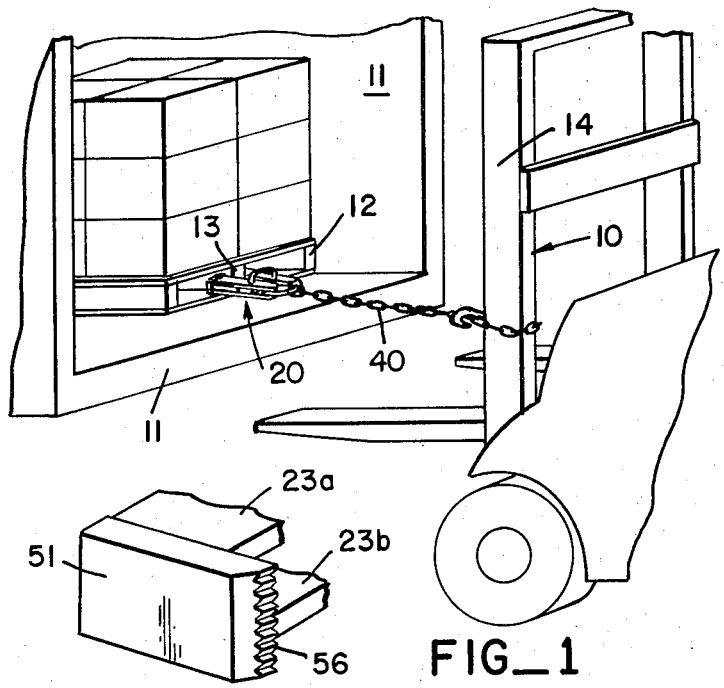
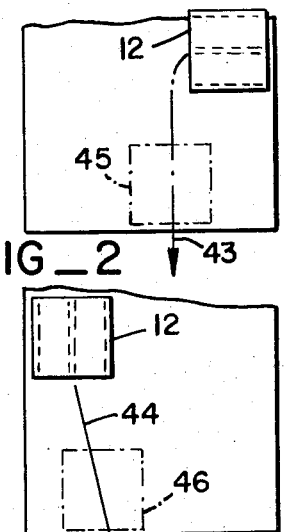
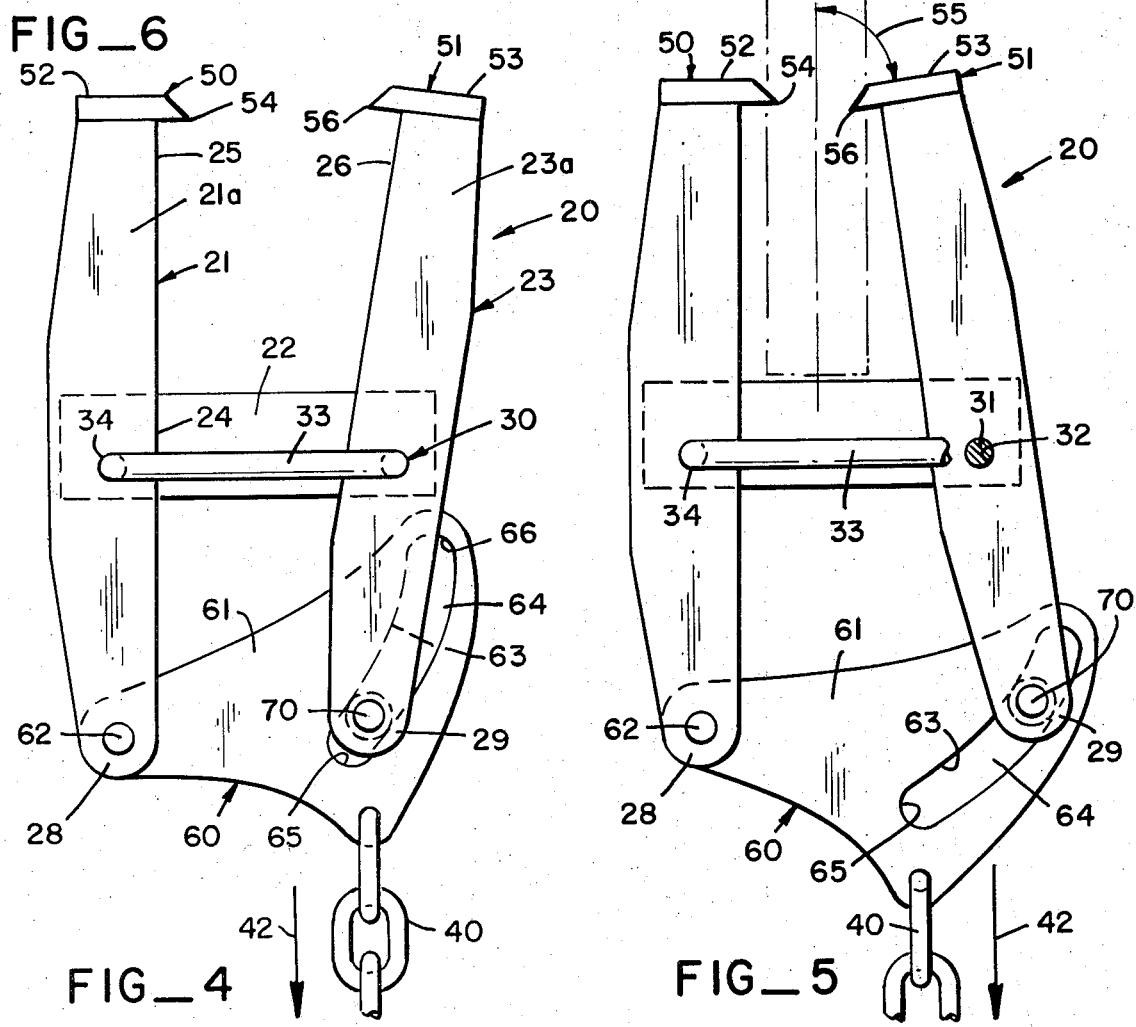

PALLET PULLER

This invention relates generally to pallet pullers or pallet pulling devices which are used in grasping and moving conventional wooden pallets.

In handling loaded pallets, it is frequently necessary to remove the loaded pallet from a location inaccessible to a fork lift truck; for example, in unloading a large cargo container filled with loaded pallets from the ground.

A primary object of this invention is to provide a simple but rugged pallet puller which facilitates removal of loaded pallets from areas inaccessible to fork lifts or other cargo handling machinery.

Another object of this invention is to provide a pallet puller which will pull a loaded pallet in the direction of the pulling force even if the force is applied at an angle to the pallet stringers.

A further object of this invention is to provide a pallet pulling device which applies a relatively uniform clamping force on pallet stringers of various widths and regardless of the drawing force necessary to pull the pallet.

Further objects and advantages of the invention will become apparent from consideration of the following description of a preferred embodiment and the accompanying drawings wherein FIG. 1 is a perspective view showing the pallet puller in use to unload a cargo container;

FIG. 2 is a schematic representation showing an angular pulling force applied to the pallet puller;

FIG. 3 is a schematic representation showing another angular pulling force applied to the pallet puller;

FIG. 4 is a top plan view showing the pallet puller in its open position;

FIG. 5 is a top plan view showing the pallet puller in its closed or clamping position; and FIG. 6 is a partial perspective view of one of the teeth of the pallet puller.

FIG. 1 shows a fork lift truck 10 unloading a loaded pallet 12 from cargo container 11. A draw chain 40 attaches to vertical frame member 14 of fork lift 10 and connects at its other end to the pallet puller 20 of this invention. Pallet puller 20 clamps to the middle pallet stringer 13 as the fork lift applies drawing force to the chain.

FIGS. 4 and 5 show the pallet puller 20 in its open and closed or clamped positions, respectively. A fixed jaw 21 is rigidly attached as by welding to one end of crossbar 22. The other end of crossbar 22 carries a movable jaw 23 pivoted on pivot means 30 which in this embodiment is a pin 31. Movable jaw 23 has holes 32 which embrace pin 31.

A U-shaped handle 33 welded at one end 34 to fixed jaw 21 forms pin 31 at its other end and passes through holes 32. Handle 33 is used to place the pallet puller jaws manually about the end of pallet stringer 13 before the pulling force is applied. One end of jaws 21 and 23, respectively carries teeth 50 and 51. Teeth 50 and 51 clamp pallet stringer 13 therebetween as shown in FIG. 5.

A spreader means 60 in the described embodiment connects the other ends 28 and 29 of jaws 21 and 23, respectively. Spreader means 60 is a flat plate 61 which is pivotally connected to fixed jaw 21 by pin 62. The plate 61 has a cam surface 63 of increasing radius relative to pin 62 which is formed by slot 64 cut into the plate 61. A follower pin 70 carried by movable jaw 23 near end 29 moves in the slot 64 and engages cam surface 63.

In the embodiment shown, jaws 21 and 23 each are fabricated from two identical steel plates. FIG. 6 shows plates 23a and 23b which together form movable jaw 23. The two plates comprising jaw 21 are welded to tooth 50 and to crossbar 22 and are connected by pin 62 at end 28. The two plates forming movable jaw 23 are welded to tooth 51, connected by pin 31 and carried by crossbar 22 and are joined by follower pin 70 near end 29.

As a pulling force is applied to spreader means 60 through draw chain means 40 in the direction shown by the arrow 42 in FIGS. 4 and 5, spreader plate 61 pivots upon pin 62 and cam surface 63 urges follower pin 70 in the direction of increasing radius relative to pin 62. This pivots movable jaw 23 about pin 31 toward the fixed jaw 21 and teeth 50 and 51 clamp pallet stringer 13 therebetween as shown in FIG. 5.

Cam surface 63 defines a constant velocity curve such that teeth 50 and 51 close at a constant velocity as pulling force is applied to draw means 40. Therefore, starting in either the position shown in FIG. 4 or that shown in FIG. 5, pulling draw means 40 one inch in the direction of arrow 42 moves tooth 51 the same distance toward tooth 50. By so designing cam surface 63, a uniform clamping force is provided between teeth 50 and 51 for pallet stringers of any width within the operating positions of the pallet puller and the clamping force remains substantially the same regardless of the amount of drawing force needed to pull the pallet and helps eliminate the tendency to bite off the stringer for large drawing forces.

In the embodiment shown, the pallet puller has been designed to apply uniform pressures to pallet stringers between 1-⅜ inches and 4 inches thick. Exemplary dimensions are — length of fixed jaw 21 between the top edge 52 of tooth 50 and the center of pin 62 is 11.75 inches, length of movable jaw between edge 53 of tooth 51 and the center of follower pin 70 is 11.75 inches, distance between edge 53 of tooth 51 and center of pin 31 is 6.75 inches, distance between edge 24 of jaw 21 and the center of pin 31 is 4.5 inches, when the distance between the center of pin 62 and the center of follower pin 70 is 5 inches the distance between edges 25 and 26 of jaws 21 and 23 is 4.5 inches, distance between the center of pin 62 and the closest point 65 of cam surface 63 is 4 inches, distance between center of pin 62 and the farthest point 66 of cam surface 63 is 6.5 inches, and the distance from point 54 of tooth 50 to edge 25 of jaw 21 is 0.5 inch.

As shown in FIG. 5, when teeth 50 and 51 clamp pallet stringer 13 therebetween, the angle 55 between the axis 57 of pallet stringer 13 and the upper edge of tooth 51 is other than 90 degrees. This also reduces the tendency of teeth 50 and 51 to shear off the pallet stringer 13. The upper edge of tooth 50 similarly is not perpendicular to the axis of pallet stringer 13.

FIG. 6 shows a perspective view of tooth 51 and a portion of jaw 23. Tooth 51 has a sawtooth edge 56 which projects toward tooth 50 to engage pallet stringer 13. Sawtooth edge 56 in the described embodiment penetrates approximately ⅛ inch into a typical stringer 13. Tooth 50 also has a similar sawtooth edge which penetrates pallet stringer 13 about ⅛ inch.

FIG. 2 shows schematically a pulling force 43 applied at about a 90° angle to the axes of the pallet stringers of pallet 12. Pallet 12 will travel in the direction of the pulling force 43 and will move into the position 45 shown in phantom in FIG. 2. Similarly, in FIG. 3 as pulling force 44 is applied at an angle to the axes of pallet stringers of pallet 12, pallet 12 will follow the pulling force 44 and will move to the position 46 shown in phantom in FIG. 3. Regardless of the direction of the pulling force, the pallet puller will turn the pallet and the pallet will follow the direction of the pulling force, even if the axis of the pallet stringer is perpendicular to the pulling force.

The specific embodiment described above is for illustrative purposes only. It will be apparent to those skilled in this art that modifications to them may be made and equivalents substituted which are within the scope of the invention defined in the following claims. For example, the spreader means 60 and follower pin 70 positions may be reversed with respect to the fulcrum pin 31 and crossbar 22 with the former located between the crossbar and the toothed ends of the jaws.

I claim:
1. A pallet puller device including
   a fixed jaw;
   a movable jaw;
   a crossbar rigidly attached to the fixed jaw and carrying pivot means about which said movable jaw pivots;
   teeth at one end of each jaw for clamping a pallet stringer therebetween;
   spreader means pivotally connected to the fixed jaw and having a cam surface remote from the point of said connection;
   a follower pin carried by the movable jaw which engages the cam surface to pivot the movable jaw as the follower pin moves along the cam surface to clamp the teeth onto a pallet stringer, and draw means for pivoting the spreader means by application of a pulling force.

* * * * *